(12) United States Patent
Schlafly

(10) Patent No.: US 7,568,114 B1
(45) Date of Patent: Jul. 28, 2009

(54) SECURE TRANSACTION PROCESSOR

(76) Inventor: Roger Schlafly, P.O. Box 67234, Scotts Valley, CA (US) 95067

( * ) Notice: Subject to any disclaimer, the term of this patent is extended or adjusted under 35 U.S.C. 154(b) by 35 days.

(21) Appl. No.: 11/821,613

(22) Filed: Jun. 25, 2007

Related U.S. Application Data

(63) Continuation of application No. 10/273,924, filed on Oct. 17, 2002, now abandoned.

(51) Int. Cl.
*G06F 11/30* (2006.01)
(52) U.S. Cl. .................. 713/194; 713/173; 713/176; 713/193; 705/64
(58) Field of Classification Search .................. None
See application file for complete search history.

(56) References Cited

U.S. PATENT DOCUMENTS

| | | | | |
|---|---|---|---|---|
| 6,092,202 | A * | 7/2000 | Veil et al. ................... | 726/27 |
| 6,871,278 | B1 * | 3/2005 | Sciupac ...................... | 713/185 |
| 6,948,070 | B1 * | 9/2005 | Ginter et al. ................ | 713/193 |
| 6,963,974 | B1 * | 11/2005 | Skinner et al. .............. | 713/176 |
| 2001/0037315 | A1 * | 11/2001 | Saliba et al. ................. | 705/70 |
| 2002/0107804 | A1 * | 8/2002 | Kravitz ....................... | 705/51 |
| 2003/0088784 | A1 * | 5/2003 | Ginter et al. ................ | 713/189 |

\* cited by examiner

*Primary Examiner*—Nasser G Moazzami
*Assistant Examiner*—Fikremariam Yalew

(57) ABSTRACT

A method and system for securely and efficiently processing transactions on a client computer with secure and insecure components. A secure transaction module runs on the secure components and uses certificates to authenticate client/server transactions. Users can fill in server-supplied forms with a very high degree of confidence that no malicious software has interfered, and that the server will get exactly what the user intended. The module maintains some tamper-resistant storage with labels indicating that certain registers can only be changed based on cryptographically secured commands from remote server domains. If such registers are scarce, then additional ones are simulated. Applications include managing online accounts, purchase of monetary credits that can be spent online, moving credentials on and off smart cards, using proxy signers to divide certificate authority responsibilities, creating self-destructing email documents, and digital rights management.

13 Claims, 5 Drawing Sheets

STM v. 1.10           Fred-22

☆   server cert.     ☆   user cert.

name: [Roger Schlafly]

phone: [ ]

account: [ ]

☒   inherit cert. data

Submit hidden labels session key smart card key date

Fig. 4

SECURE TRANSACTION PROCESSOR

Continuation from application Ser. No. 10/273,924, filing date Oct. 17, 2002 now abandoned.

BACKGROUND

This invention relates to computer security, and more particularly, to ways of authenticating computer transactions between distant parties.

Many operations in electronic commerce can be understood in terms of client/server transactions. For example, a bank customer wants to log into a bank web site, identify himself, transfer some money from one account to another, and log out. The bank web site acts as the server, the customer computer as the client, and the transaction is the money transfer. Some network protocols are symmetric, or peer-to-peer, but it is often helpful to think of transactions between them as client/server transactions anyway.

The Public Key Infrastructure (PKI) is a way of managing identifying credentials in a computer network. Each entity typically has a certificate with its name and public key signed by a certificate authority (CA). Certificates can be validated by checking signatures against root certificates, and also by checking lists of revoked certificates. X.509 certificates bind a distinguished name to a public key, for a given time interval, possibly with some constraints. X.509 certificates, and how they are used in a PKI, are described in IETF RFC 2459 and in the book Digital Certificates—Applied Internet Security, by Feghii, Feghii, and Williams. Addison-Wesley, 1999.

A PKI is commonly used to help secure commerce on the internet. For example, a bookstore will have books listed for sale on a web site, and customers can connect with a web browser and make a purchase. Internet protocols such as SSL (or TLS) can establish a session key for encrypting transmissions and use certificates to authenticate the parties. It works well enough that millions of people are ordering products online with credit card numbers. But there is a need for systems with a higher degree of reliability for some applications. SSL is described in U.S. Pat. No. 5,657,390. TLS is very similar to SSL and is described in IETF RFC 2246. More information on cryptography is described in Handbook of Applied Cryptography, by Menezes, van Oorshot, and Vanstone, CRC Press, 1997. There are standard cryptographic operations for secure hash, message authentication code, block cipher, and public key operations, such as SHA-1, HMAC, AES, RSA, DSA, and ECC. These are described or referenced in US NIST FIPS, IEEE 1363, and related documents.

With either a cipher key or a public key, there are known methods for encrypting a data block into a ciphertext that is nonmalleable and resistant to an adaptive chosen ciphertext attack. Such a ciphertext is very difficult to forge.

Truly secure operating systems are difficult with current technology. Most computers today are susceptible to viruses and other problems. To reduce those problems, computers are being developed with trusted components. The trusted hardware might be the motherboard, cryptographic unit, keyboard, mouse, and a video display mode, so that the user can reliably have some tamper-resistant input and output. It might also include other peripherals. The trusted software is a trusted kernel that is a highly reliable part of the operating system. When the trusted kernel starts up, it verifies various hashes or certificates, and it is capable of attestation that a program is running in an environment with specified security properties. The attestation can take the form of hashes and certificates that can be validated elsewhere. A combination of hardware and software features may also protect certain program operations from interference by other programs, and provide sealed storage for programs running in the trusted environment. The Trusted Computing Platform Alliance (TCPA) issues specifications for trusted computing platforms, and their effort is described in the book Trusted Computing Platforms: TCPA Technology in Context, edited by Siani Pearson (Hewlett-Packard Books and Prentice-Hall, July 2002). U.S. Pat. Nos. 6,327,652 and 6,330,670 describe a digital rights management operating system that could act as a trusted platform. Other approaches may also be possible.

The TCPA specification uses a PKI to manage certificates that assure trust for certain hardware components. A PKI has the advantage that, in some cases, trust can be withdrawn by revoking a certificate. If a trusted kernel uses a PKI to attest that a system is securely doing what it pretends to be doing, then a verifier might have to check some signatures on some certificates as well as check that the certificates have not been revoked. Someone might attack the hardware to release secrets that are supposed to stay within a trusted computing platform, but that does not destroy the security of other trusted computing platforms.

Secure distribution of electronic content presents some unusual challenges. In particular it is difficult to buy just one copy of a digital file because files are copied so easily on computers. Some digital rights management systems are described in U.S. Pat. Nos. 6,385,596, 6,427,140, and 6,445, 797, and in US patent application 20020006204.

Smart cards are often used to help secure computers. Typically they hold a public/private key pair and can act as a secure component to a computer that otherwise might not be so secure. But it is difficult to use a smart card for a secure transaction if the computer itself is insecure.

There is a need for a computer system component that can manage transactions securely in environments where the operating system, network, and users cannot be trusted.

In some applications, there is a need for a server to obtain assurance that it is dealing with a live person. For example, an email provider might want to let legitimate users subscribe to email accounts, but not allow automated junk mailers to subscribe to large numbers of accounts for the purpose of sending unsolicited bulk mail.

In other applications, bank customers rely on internet terminals in public libraries to transfer funds. The customer can usually assume that no one has tampered with the computer motherboard, but cannot be sure whether a previous user might have deliberately or accidentally installed software to intercept passwords or perform other malicious acts. Thus there is a need for users to be able to engage in some trusted transactions on a computer that is only partially trusted.

Computer security features are subject to attacks. There is a need for systems that are sufficiently flexible that they can adapt if parts of the system are compromised and secrets are revealed.

Getting certificates in today's PKI can be cumbersome and privacy invading, and the certificates do not always have the information that the user wants. There is a need for users to generate their own certificates.

There is a need for systems that provide client security services like secure email, by having clients communicating privately with servers.

There is a need for a smart card that can securely hold user and vendor secrets, and that can be safely used at a public computer terminal.

A PKI can be undermined by a compromised key, so security requirements often involve checking a certificate revocation list (CRL). Many systems use PKI but ignore CRLs. There is a need for systems that make CRL checking mandatory.

There is a need for a convenient system of electronic money on personal computers and smart cards, for buying documents and services on the internet.

There is a need for secure mechanisms that can work with a security boundary that is within a client or server computer.

BRIEF SUMMARY OF THE INVENTION

The foregoing needs, and other needs and objects, are fulfilled by the present invention, which comprises, in one aspect, a method of managing computerized transactions securely in an environment where computers, networks, and users may be untrusted. It works by finding components and parties that can be trusted, and amplifying that trust in order to assure the integrity of transactions. It also works by carefully defining who is trusted for what aspects of the transaction, and in some cases, allowing remote computers to control memory registers.

The exemplary operating environment is a computer which is assumed to have a trusted platform (TP) as well as a conventional operating system. The rest of the operating system may or may not be secure. This computer runs as a client to various servers, some of which are able to engage in secure transactions.

The major components comprise the invention: a secure transaction module (STM), a client communications manager (CCM), a certified commerce server (CCS), and a smart token. The STM and the CCM run on the client computer, with the STM running under the control of the TP. The CCS may be elsewhere on the internet, and has an STM as well. The smart token is usually a smart card or a small tamper-resistant electronic device with a processor, some memory, and a serial port. The smart card connects to a client computer. These components are shown in FIG. 1.

The client computer can download forms from a server, and a user at the client computer can securely fill in and submit the forms, thereby completing a secure transaction. The transaction data is all signed, so there is assurance that there has been no tampering. Certificates are used, as in a usual PKI, but the main purpose of the client certificates is to guarantee the integrity of transactions. Keys and other sensitive data can be kept within the STM so that not even the user can access them. The client computer has certain memory registers that can be tagged as being under the control of a CCS in a manner somewhat analogous to what are known as cookies in the prior art. Cookies are described in IETF RFC 2109.

BRIEF DESCRIPTION OF THE DRAWINGS

FIG. 4 shows a client form as it might be displayed by a STM.

DETAILED DESCRIPTION OF THE INVENTION

The invention preferably runs on a trusted computing platform with a trusted kernel that can interact reliably with the user, and that can attest to its security. The rest of the operating system must be usable, but may be infected with a virus or otherwise may have reliability problems. The computer is connected to a network that may be subject to malicious attacks.

The STM runs under the control of the TP, and the TP can vouch for the STM. The STM can securely interact with the user by asking the user to enter a password or to fill in and submit a simple form. The hardware and TP can assure the reliability of sufficient I/O to accomplish this task, even if the operating system and network are under (software) attack. An attack might disable the computer and prevent the user from interacting with the STM, but it will not change an interaction into something else, if everything is working properly. If the TP attests that the STM interacted correctly with the user, then there is a high degree of confidence that the record of the interaction correctly reflects what the user saw and did.

The CCM might be a regular application program, like an internet web browser or a browser plug-in. It can contact network servers, and exchange messages and files. Preferably, it can connect with the encryption and authentication security offered by SSL or TLS or a virtual private network. When additional security assurances are needed, data is transferred to and from the STM.

The STM has three kinds of memory available to it while it is running. It has transient memory (usually RAM) that is exclusive to the STM and is erased when it is reclaimed by the TP. It has sealed memory, for storing small amounts of sensitive data like cryptographic keys. This memory is persistent (it survives system reboots) and is typically secured on the motherboard. The TP prevents any other application from accessing the data. The STM also has externally secured storage. The STM can encrypt data with an internal key, and pass it to the CCM for storage on a disk or server or elsewhere. The external storage has the disadvantage that other programs could corrupt or delete the data. But the data should be useless to anyone without the key, and the STM can decrypt later if it still has the key and it gets the unmodified data back. Also, the STM should reject any encrypted data that has been modified outside the STM.

Figure 1:
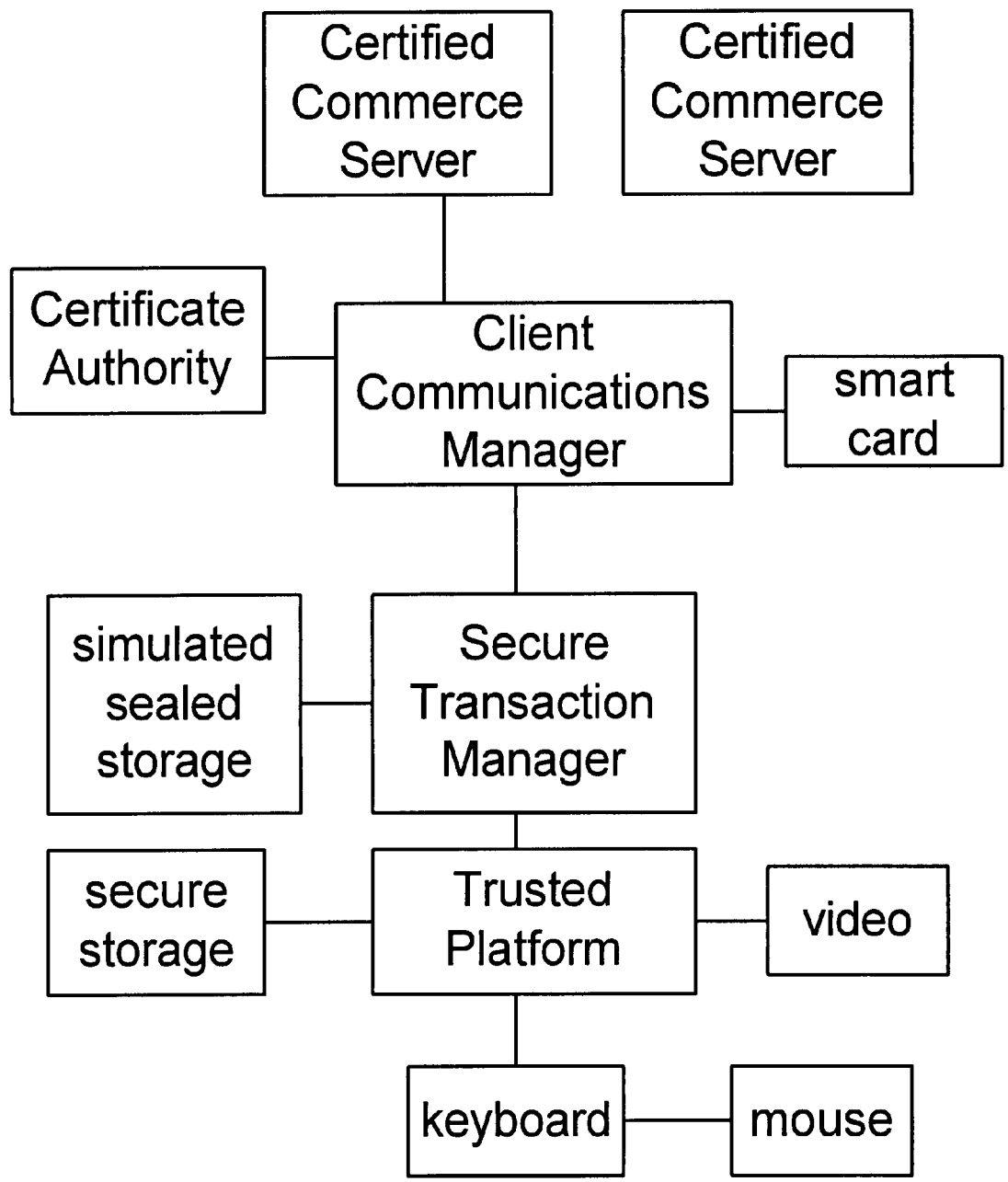
FIG. 1 shows a block diagram of a secure transaction module as part of a client that is connected to a smart card and a server.
Figure 2:
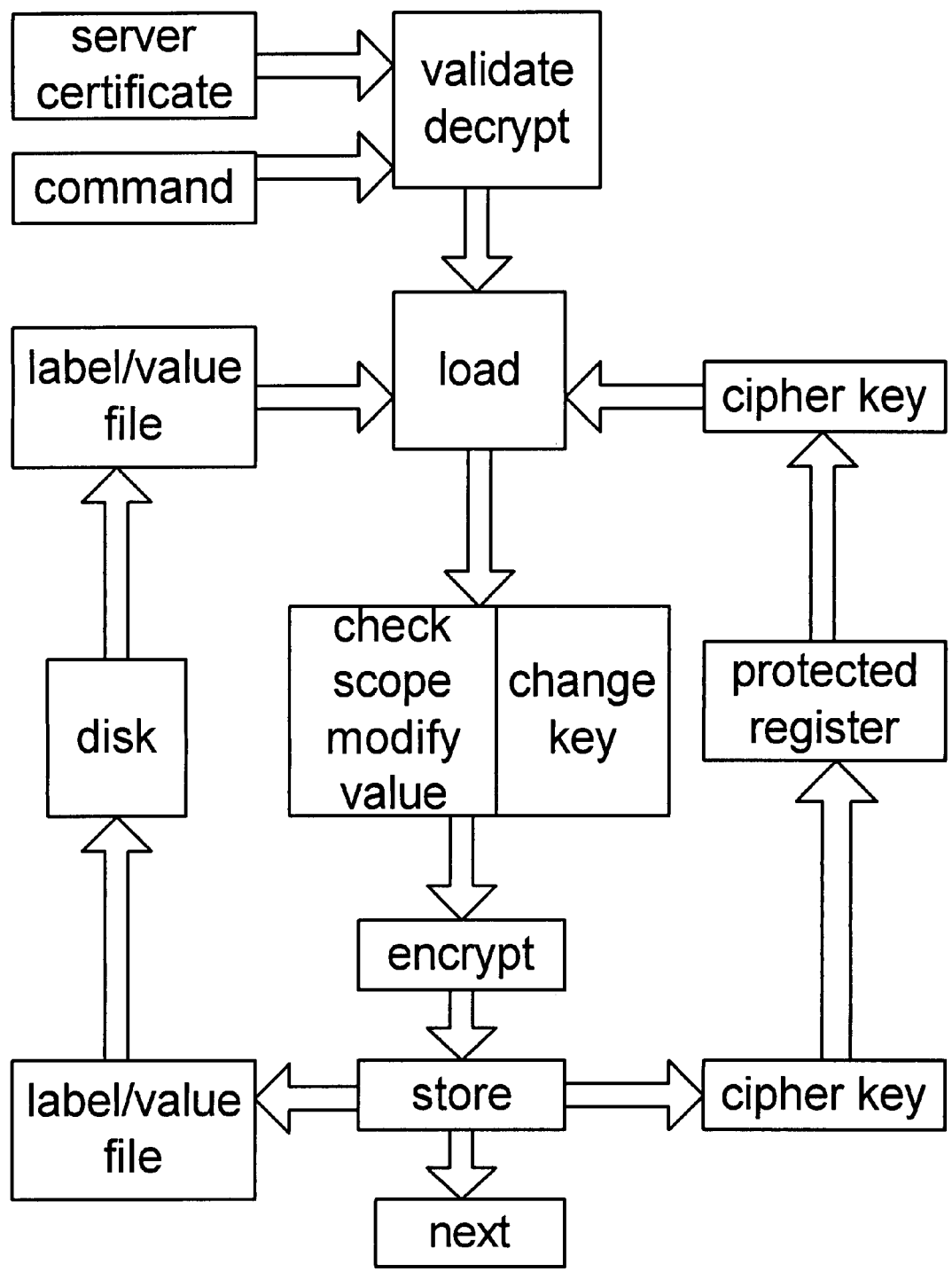
FIG. 2 shows a flow chart of a secure transaction module updating some (simulated) sealed storage in response to a server command.

In some cases, a TP might have a very limited amount of sealed memory available that is truly in tamper-resistant hardware registers. If the TP has space for at least one secured cipher key, then additional sealed memory can be simulated as follows. A cipher key is generated at random, and stored securely in sealed memory. The data block to be securely stored is encrypted with the cipher key, using a mode that is nonmalleable and resistant to chosen-ciphertext attacks. The encrypted data block can then be stored in a location that might be readable by intruders. When a value in the data block needs to be changed, the STM accesses the encrypted data block and the secured cipher key, decrypts to get the data block, changes the value, discards the cipher key, generates a new cipher key, saves the new key in secured storage in sealed memory, re-encrypts the data block with the new cipher key, and saves the new encrypted data block. Then there is no copy of the old cipher key anywhere, and the old encrypted data block is worthless. The process is shown in FIG. 2. The STM relies on the TP to make sure that only the STM has accessed to sealed memory that is reserved by that STM.

It is possible that a TP would have extra tamper-resistant registers, but that the values might not be kept secret from other applications. In that case, it is still possible to simulate sealed memory as long as the TP also has some ability to save secrets associated with the STM. (For example, the TP might save such a secret with a hash of the STM by encrypting with a platform-specific RSA and storing an encrypted block on the hard disk.) The STM reserves one register that it can exclusively change. In that register, it stores a counter, or a hash value, or a cryptographic initial vector (IV) or some other convenient value. Then when the STM encrypts a data block, as above, it puts the register value in a header for the data block, and lets the TP encrypt and save it on the disk as data that only the STM can decrypt. When a value in the data block needs to be changed, the STM checks the register value, and changes it by incrementing the counter or rehashing the hash value, or some other way of reliably producing a changed value. The data block gets re-encrypted with the changed register value. Any future attempt at reading the data block is rejected if the register value does not match the header.

The point to simulating sealed storage is that a TP might have the facility to maintain secrets for a trusted application, but not to directly maintain a unique copy. The methods for simulating sealed memory described here have the advantage that they are resistant to an attack where the STM saves some values on the disk, someone duplicates that disk file, the STM changes one of the values on the disk, and someone swaps in the old disk file in order to fool the STM. Such an attack would be undesirable because it might allow a client to purchase some electronic money, and then spend it twice. They depend on putting a cryptovariable in a tamper-resistant register or other protected storage that only the STM can change, and using that cryptovariable as a cipher key or IV (or something similar).

Sealed memory, whether directly protected by hardware or simulated as above, can be used to either protect user secrets or server secrets. For example, it can be used to protect the list of passwords that a user has for logins into various servers. Such a list would be shown to the user, but would not leave the STM. Sealed memory can also be used to protect server secrets that the user is not allowed to see. And sealed memory can protect session keys that are implicitly used by the client and the server, but which are only used for encryption and authentication operations within the STM, and not shown to either the client user or allowed into server databases.

Preferably, the TP provides cryptographically secure random numbers. If not, then they can be obtained as follows. The US NIST FIPS 186 discloses a pseudorandom number generator. This can be seeded with random numbers by asking the user to type random keys or move the mouse randomly at configuration time. Additional random data may be added by making system calls whose results would not be predictable by an adversary. Either way, the STM has the ability to generate random numbers.

Preferably, the TP has some sort of secure clock or timer available. If so, then the STM can use dates and times with whatever assurance the TP can provide. Alternatively, the CCM may be able to connect to some sort of secure time device. Otherwise, the STM has to rely on the computer system time when date or time functions are needed.

A domain is a set of signature keys. There are two common ways in which domains are defined. The first is from a vendor certificate with a public signature key in it, and the domain is that key. The second is from a CA certificate, and the domain is the set of all signature keys in certificates that are signed by the CA certificate. More generally, a domain might be a subset of the keys in some other domain based on a certificate constraint, or it might be a union of other domains.

The STM has the ability to encrypt data blocks to be secure against adaptive chosen ciphertext attacks, and to decrypt. With a secret key SK, it chooses a random IV, encrypts with AES-CBC, and attaches a MAC with HMAC. The AES cipher key for encryption by the client is defined by the first 128 bits of sha1 ("aes-128", "client",SK), and the HMAC key is defined by sha1 ("hmac-sha-1", "client",SK). The keys for encryption and MAC by the server are similar, but different. An alternative embodiment might use another cipher, or another mode that offers privacy and authentication. For example, it might apply the MAC and then encrypt, rather than encrypt and then MAC. It can also encrypt with a public key, using RSA-OAEP, DHIES, or ECIES. Decryption is similar. An advantage of adaptive chosen ciphertext security is that even if an adversary gains software control of the client computer and tricks the STM into attempting to decrypt hostile messages, it is still infeasible for him to forge acceptable messages or to decrypt secrets.

Forms

The STM displays and processes forms. FIG. 4 shows a form. The form shows some organized information together with some items allowing user input. Possible user inputs include text strings, checkboxes, and other common elements of HTML forms. The forms are specified by a subset of HTML, but other syntax is also possible.

Each input to the form is associated to a label, a value, and optional tags indicating attributes. The label is just a name to identify the value. The value is the data item contained in that part of the form. Typically, the value has some (possibly blank) default string, and is replaced by user input. The tags might restrict the input to a specified number of characters.

A label is either implicitly or explicitly tagged with attributes that say who can read or write the value, and sometimes even what can be done with the value. For example, a form might ask for a user's name, and allow the user to read and write the value. A form might ask for the user's password, and let the user enter a password from the keyboard, but the password is not allowed to be displayed. A user might be allowed to read a value, like an account number, but not be allowed to change it. There might also be a value like a session key, that the user cannot read or write, but is allowed to use as a cryptographic key or include in a form to be submitted.

Tags can also be used to describe what servers can do with values. A tag can say that only a server domain can read a value, or that only a server domain can write a value. For example, a form might have a label named "account" whose persistent value is a 30-digit account number that the user cannot edit or even see at the client computer. The value is initially blank, and filled in by a command from the server once the user enrolls in an online service or identifies himself as someone who already has an account. The server command has to be one that is signed by a key in the server domain specified by the tag. The client's STM verifies certificates as necessary to be sure that the signature is from the proper domain.

Other tags can indicate a validity period for a tag. For example, a tag might say that a label expires in two hours, or it might give a specific expiration date.

Certain labels have a special predefined meaning. For example, the label "date" causes the current date and time to be generated as the value when the form is submitted. If the STM has secure access to a trusted clock, then it can vouch for the validity of that date. Also, the server could put a date in the form with a tag that instructs the STM to include the date in the submission unmodified.

A label can be tagged as being persistent, meaning that its value is saved in sealed storage. When it is persistent, it is usually also tagged as being under the control of some domain, so that only a key from that domain can change it. Otherwise, label values can be included in a form submission, but is not necessarily saved by the client.

Base Certificates

When a user installs the STM, he must configure some keys and certificates that enable full functionality. First, the STM inspects the hardware and software platform to make sure that it is suitable. Then it generates, with the help of the TP, an attestation that the platform meets requirements.

The user has some configuration options for the STM. He can choose an identifier to put on top of the display window to reduce chance of spoofing. He can choose a password or PIN for access. He can choose a timeout period, such as 4 hours, so that the user must re-enter the password after a timeout or reboot. The data for these options is kept in sealed storage, and protected from unauthorized change.

To get a base certificate, the CCM connects to an enrollment CA at a suitable server, and downloads a form that is passed to the STM. The STM uses that to prepare a signature key and a certificate request, and it submits this data, along with some user options, so the CCM can send it back to the server. The private key is put in sealed storage. The server verifies that the attestation is sufficient to run the STM securely, that the STM produced the submission, and that the STM will adhere to specified (or implied) policies in certificates. This may involve checking certificate revocation lists from the computer manufacturer, and making sure that the necessary hardware is present. Attestations involving particular hardware might be rejected if that hardware is not deemed sufficiently secure, even if all the signatures are technically valid. The base certificate becomes another form of attestation that the TP and STM are conforming. The certificate says what version of the STM is in use, as well as what optional trusted hardware is present, such as a trusted clock.

The user can create several base certificates. He can delete them whenever he wants, and then the associated private key gets deleted. He can put as much or as little information as he wants into the base certificate, depending on the enrollment CA. A CA might offer free base certificates responsive to a number of enrollment forms. Some might ask for names, taxpayer identifier numbers, etc. The CA does not necessarily verify this data, and it might just be there for the convenience of the client. The CA does verify that the client is submitting with an appropriate version of the STM and running on a reasonably secure platform.

The base certificate might also have a field guaranteeing that CRLs will be checked at regular intervals. If so, then the STM will only use that certificate if it has the up-to-date CRLs. Having checked the CRLs assures a server that the client will not inappropriately release secrets to an insecure device.

The user associates a base certificate to a form prior to submitting it. He has the option of inheriting values from the base certificate to the form.

Form Submission

When the user submits a form to a CCS, the STM must encode, encrypt, and sign it. It encodes label/name pairs in a simple ASN.1 DER format. Another format, such as that used in HTML CGI could also be used. The details of the encrypting and signing depend on whether a session key has been established.

If a session key (SK) has not been established, then the STM reads a server public key for encryption from the header of the form. It uses that public key to establish SK, and uses SK to encrypt and sign the encoded form. The result is packaged with enough information for the CCS to deduce the SK, decrypt, authenticate, and decode the form, and verify the base certificate. If SK has already been established, then the public key operations can be skipped.

Depending on the communications protocol, a session id may be added so that the CCS will know the source of the encrypted form and use the right SK. The session id might be a hash of SK, or a hash of the base certificate, or it might be determined in other ways. The CCM might strip off or replace the session id if the client is already identified in some other way, such as having an open network connection.

An alternate embodiment might use different cryptographic primitives. It might also sign before encrypting, rather than afterwards. The point is that it uses an encryption combined with authentication, and is resistant to strong attacks.

The CCM gets the cryptographically secured form submission from the STM, and transmits it to the server. Actual transmission by the CCM to the CCS might use SSL or a virtual private network, for additional protection.

Server Commands

The CCM can download server forms from a CCS. The forms may be encrypted or not, but they are always authenticated with either a signature or a MAC when they are passed to the STM. The CCM can also download non-form data, such as an encrypted music file. In the latter case, there is a header, and the CCM uses the STM to decrypt and authenticate it. If there is no form present, then no user interaction is required.

In the case of either a form or a data header, the authenticated information could include special commands for the STM. Such commands can include modification of a value in sealed storage, provided that the server key is suitable and that the label tags allow it. For example, if the label account is in the scope of the domain D, and so is the server, then the server could issue the command D:account=U1098712345.

In case two different servers use the same label, the STM must be careful to resolve the scope on each label properly, so that one label controlled by one server does not get confused for another. The preferred way is to just use domains that are defined by either CA certificates or vendor certificates, and to only recognize labels in a CA domain if they are explicitly authorized in the certificates. That way, no vendor can unexpectedly usurp the label of another vendor. Other embodiments might allow more complicated domains, and more complicated rules for resolving scope.

Managing Accounts

A client user can connect to a CCS with his CCM/STM for a bank account transaction as follows. The user connects to the bank web site, and downloads a form to the STM. The form is signed, and the user can verify the certificate in order to be assured that he is really communicating with the bank. He enters his name and whatever other identifying information that the bank requires. There is a label for a login identifier, but it is left under server control. The user submits the form, and the STM encrypts it with the bank's public key. The submission includes the user's base certificate, so that the bank is assured that a genuine TP and STM is in use. A session key is established for future communications. If the bank is dissatisfied, it can send the user additional forms. Eventually the bank sends the user a login identifier, to be stored in the user's sealed storage.

Depending on the tags, the login identifier might be displayed by the STM so that the user can write it down or memorize it. It might also be exportable to a smart card or to an STM on another computer. With the login identifier and an STM, the user can easily identify himself and his account to the bank, and the bank will be assured that it has a secure connection with the proper user.

The user may be able to simplify his submissions by using information in base certificates. A user may have several base certificates, with varying amounts of information in them. Some might have as little as possible, for anonymity purposes. Others might have name, address, taxpayer identifier number, telephone number, email address, or other personal information. The CA may or may not verify any of this information. A CA might use standardized forms for creating certificates, and then the user could use the certificate in lieu of typing in his personal information repeatedly.

It is possible for the client user to have his CCM/STM acquire a value that is saved in sealed storage and acts like electronic money. The user cannot directly modify the value himself (except to delete it), and it is only changed by suitably authorized command from certain CCS servers.

Suppose the user wants to buy $100 worth of electronic books, music, or movies. He connects to a music vendor's web site, enrolls an account by submitting a form to the vendor's CCS, and pays $100 by credit card or other means. A field within the form has the label "current balance", and is tagged to be persistent and only changeable by the vendor's key. When the vendor confirms the $100 transfer, it changes the value for the label from an undefined state to $100 and also changes the session key. Now the user has a $100 balance that he can use to spend with that vendor. When he downloads music, the vendor encrypts it just for him. When the user's STM decrypts the music, it finds a header command that makes an appropriate deduction from his current balance. For example, the command could say, "current balance—=0.25" to indicate that 25 cents should be deducted. If the balance were restricted to nonnegative values and the deduction would make the balance negative, then the operation is aborted and the user is unable to decrypt the music until he replenishes his balance.

The user may be able to deactivate the TP, or delete the STM, or erase his sealed storage, or delete all records associated to a particular domain, and thereby lose the ability to access or use the current balance. But he shouldn't have the ability to change the current balance to some other value, or to restore the balance to some previous value.

Several vendors can cooperate to make one electronic money account usable for products or services offered by any of the vendors. Each vendor gets a vendor certificate from a common CA, and either the CA certificate or each of the vendor certificates indicates that each vendor has the authority to change the value for the label "current balance". When the user enrolls, the form indicates that any key signed by the CA is in the domain of keys that can change the current balance. Then the user can spend the money at any of the vendor sites, and his current balance will be adjusted if the certificates check out.

The label for the balance may or may not be tagged as exportable. If it is exportable, then the user may be able to transfer his balance to a smart card, and later transfer it to a computer with a STM. A server could reject a payment if it determines that the money was transferred to an insecure device.

Labels under server control can also be used for digital rights management. No matter how an encrypted document is purchased, decryption of the document could cause the necessary key to be erased, depending on some condition like a time limit expiring.

Smart Cards and Other Devices

The STM, with the help of the CCM, can communicate and exchange data with other computers running a TP and STM. It may also communicate with other secure devices such as smart cards.

Figure 3:
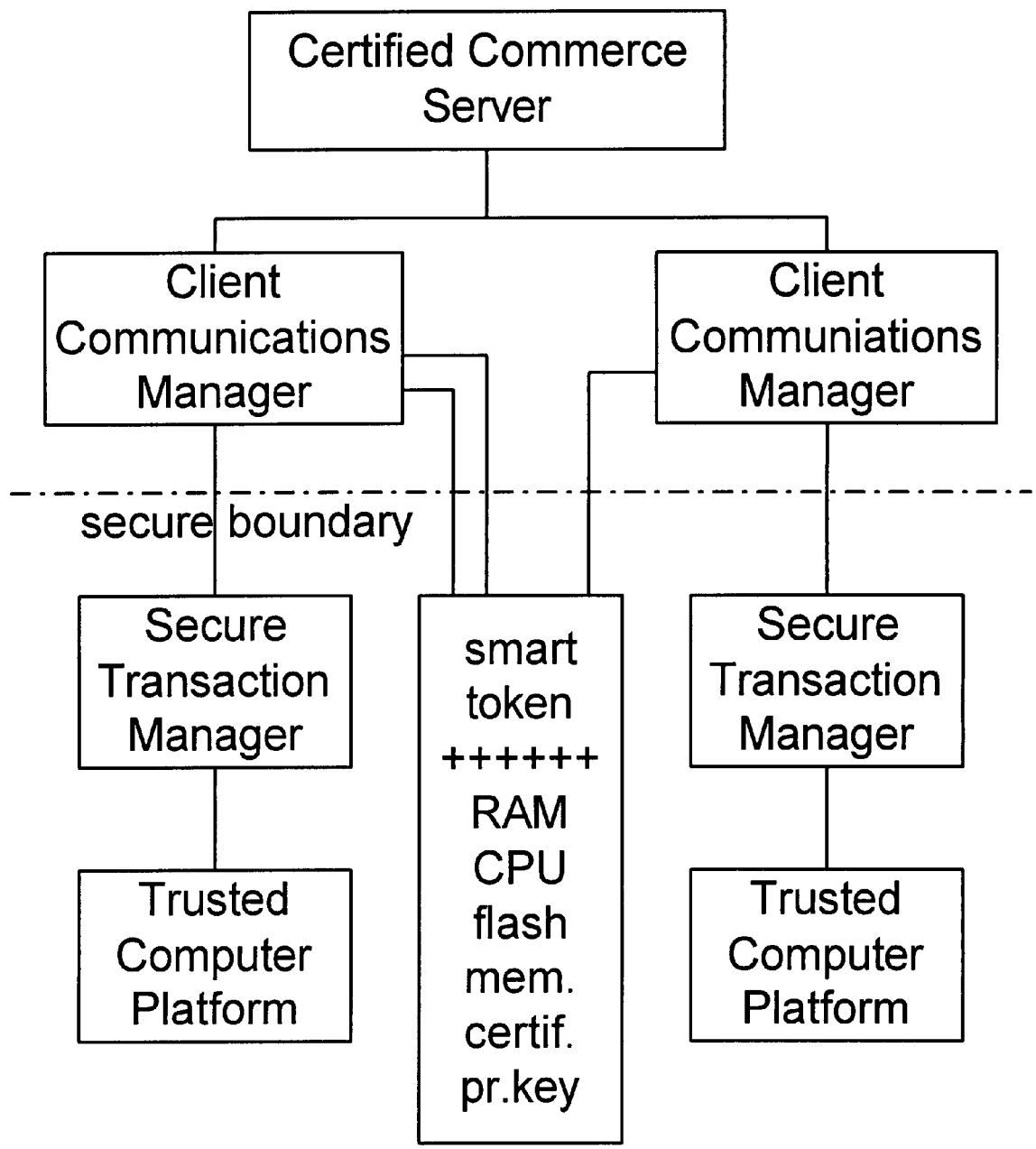
FIG. 3 shows a block diagram of a certified commerce server connected to a couple of clients using a smart card.

FIG. 3 shows a smart token, as it interfaces with a CCM and STM. It has a central processing unit (CPU), RAM, and flash memory. It draws power from the serial port, while it is connected. The flash memory is persistent, and retains values after losing power. A smart token might also be a smart card, or similar small electronic device.

Smart cards and other devices are especially useful in connection with a CCM/STM if they can attest that they will respect certificate policies that are expected by the STM. In general, the STM is able to transfer data to another device if the data is marked with export restrictions and if the device can attest that it will abide by those restrictions in a manner acceptable to the STM. The dotted line marks the secure boundary. The data from the STM may have to go outside the secure boundary to get to the smart card, where it becomes secure again, and outside the boundary again to get to another STM.

If the STM can recognize a smart card certificate, and accept it, then the STM can export data to it. For example, an STM could export a copy of a login identifier to a smart card for later transfer to an STM on another machine for the purpose of allowing the same user to connect to his bank account on a different computer. The smart card must attest that it can decrypt the data, maintain it in sealed storage, and only release the data in a cryptographically secured form for another STM that properly attests itself. Furthermore, if there is an associated PIN, the smart card must maintain the PIN and resist attempts to guess the PIN.

A label/value pair could also be tagged as moveable, instead of copyable. That would be appropriate for a value representing a monetary balance so that the money could only be spent on one device. The user can move the money to a smart card, and at the same time the STM deletes it from its own sealed storage. The value is not allowed to be in two places at once. Later, the user can transfer the value from the card to another computer with an STM. Again, the value is deleted from the card as it is moved to the STM. This prevents the user from spending the same money twice.

A monetary balance might also be partially exportable, in which case some of the money can be moved to a smart card, leaving the remainder with the STM.

The user might also purchase and download data that he can decrypt, but only release to a secure peripheral device. For example, a sound system connected to a serial port on a computer might be able to attest that it can decrypt digital music and play it on speakers, without releasing the music in digital form. The STM might recognize such an attestation, and then allow data to be tagged for decryption and re-encryption for the sound system. The user does not have access to the digital music as the STM processes it.

Server-Based Email

A CCS is able to act as an intermediary for private email (or some other form of messaging) in order to offer some extra assurances. Suppose Ann wants to send email to Bob, and both Ann and Bob use a CCM/STM on client computers that can access the CCS. Ann can download a form, and use the form to send a message to the server that is intended to eventually get to Bob. The form includes Bob's email address and the current date and time. The contents of the message itself can be loaded into the form, if Ann wants to certify that the contents were reviewed by human eyes. The form (with the message) is submitted to the server. The signature on the form certifies that the message was sent from the STM on Ann's computer at the date and time in the form.

The server sends a message to Bob indicating that a message is waiting for him. He downloads a form in which he agrees to receive a message from Ann and to acknowledge receipt. Bob then sends the form, and gets the message decrypted in another STM form. Bob submits a form acknowledging receipt of the message, and the server notifies Ann. Ann then gets an assurance that her message was viewed by someone using the STM at Bob's computer.

Using a trusted server for email has a couple of advantages. One is that the sender can ask for, and get, receipts, as explained above. Another is that the CCS can tag documents for self-destruction. The downloaded email document can have a header with a tag that the document cannot be exported from the STM, and with a server command to change the session key. This eliminate Bob's ability to save the decrypted document, or to decrypt the document a second time. There can also be time limits that are dictated by the server, so Bob can only view the document for a particular length of time.

Another advantage is that the CCS can issue public keys based on another entity's identifier, in a manner similar to what is commonly known as identity-based encryption. The CCS keeps a secret S, and can generate public/private key pairs by hashing an identifier like "bob@hotmail.com" and the secret S for the private key. The public key can be sent to Ann on request, even before Bob has the key. Bob can fill out a form and have the private key emailed to him, and it will be secured so that the private key will be locked into sealed storage in the STM. Keys can be generated with restrictions by adding those restriction to the data to be hashed. For example, a key could be limited in time by using an expiration date. The CCS does not have to keep a database of issued keys, because it can use the secret S to reconstruct them as needed.

Proxy Signing

Sometimes it is advantageous to sign messages by proxy. The STM can be used to generate a cryptographically secured block of data that allows another computer to issue a signature. For example, one computer could have its STM generate a key, place it in a form, submit it, and have the CCM transmit it securely to another server or client, to be used only per instructions contained in the form. The instructions might be to use the key once and destroy it, or to keep the key in secured RAM, or to only use the key within certain time constraints, or to only sign a particular hash, or to only sign certificates that have certain constraints.

One application is to blind signatures. A blind signature is a signature on something that the signer does not see, and it is useful for anonymous electronic cash. Another application is to help secure highly sensitive keys. One computer might maintain long-term private keys in a highly secure manner, and only occasionally release authorizations for a server on the internet to act as a certificate authority which signs credentials for others on the internet.

Another application is to allow parties with partial keys to use a remote server to combine the keys and generate a signature. For example, an RSA key could consist of three prime factors, one held by Ann, one held by Bob, and one held by Carol. They all agree to use their joint key to sign a message or certificate, but do not trust each other with the factors. They could agree on a CCS, and each fill out a form designating that his/her factor is to be used by the server for the signature while in secured memory, and then to erase its copy of the factors.

Partial keys could also be used for DH/DSA or ECDSA signatures. Suppose Ann has an ECDSA private key Ka, and public key A, and Bob similarly has Kb and B, with the keys sharing the same system parameters. Then Ka+Kb is a private key for the public key A+B. Ann could connect to a CCS, and fill out a form indicating that Ka is being released to the CCS for the purpose of signing a given message with the private key for A+B. Ann's submission is cryptographically secured by the STM. (Ann may or may not use the pair (Ka,A) to authenticate the submission.) Bob does likewise. The server has its own STM that securely unwraps and authenticates Ka and Kb, generates the signature from Ka+Kb and the hash of the message, and erases its copy of Ka and Kb. No one retains a copy of Ka+Kb. Copies of A and B can be disclosed without harm.

Figure 5:
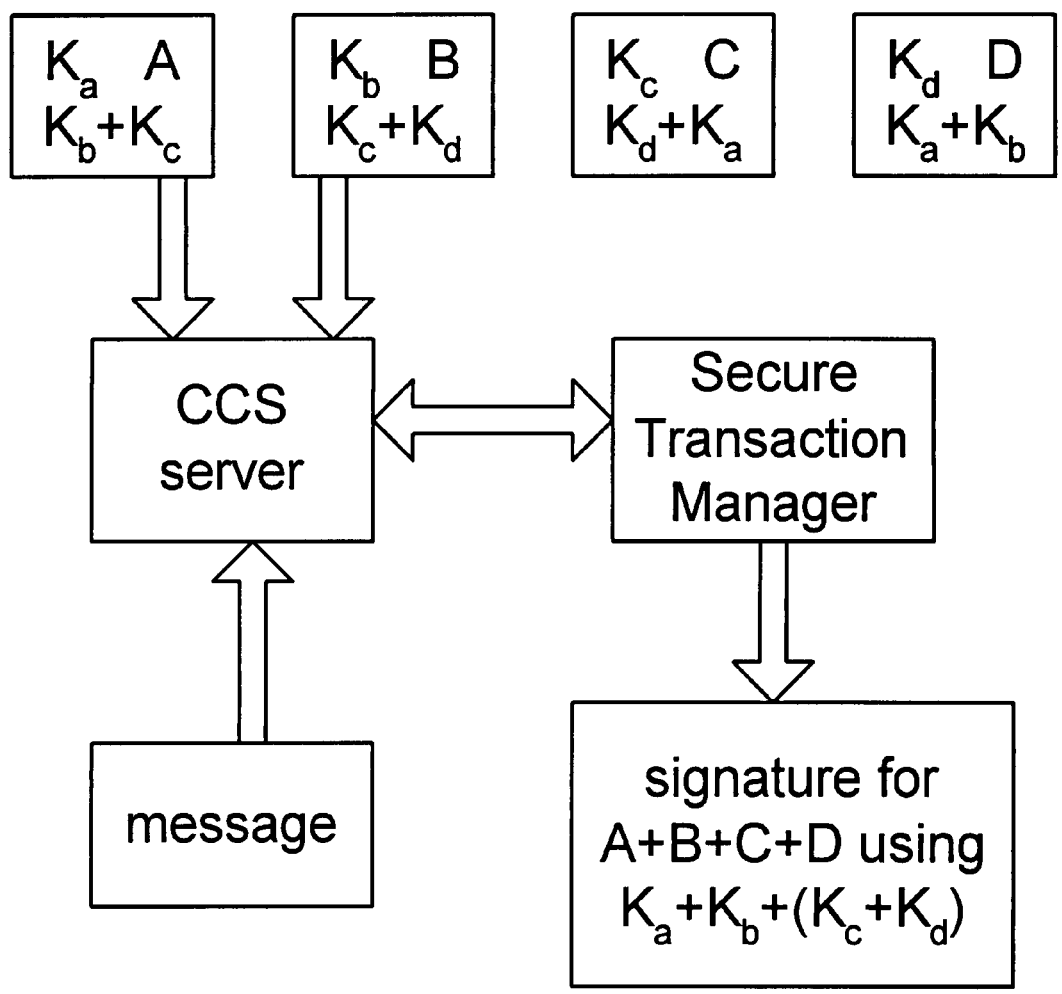
FIG. 5 shows a block diagram of two out of four key trustees cooperating to permit a server to produce a proxy signature.

FIG. 5 shows using the invention to reliably maintain signature keys for a CA or other server. CA keys can be very valuable, and must be protected against loss, theft, and misuse. The CA key is split among four trustees, A, B, C, and D. A signature requires the cooperation of at least two of the four trustees.

First, an intermediary E generates a certificate and gives copies to A, B, C, D. All have versions of this invention running on separate computers. A, B, C, D each generate keys Ka, Kb, Kc, Kd with E's parameters and request certificates from E. Each certificate is coded so that it trusts only party's in E's domain.

E's private key is then destroyed.

B sends its private key to A in a form that is encrypted and encoded so that it can only be combined with C's private key to form B+C. C does likewise, and A retains the private key to B+C.

Likewise, B obtains the private key to C+D, C obtains the private key to D+A, and D obtains the private key to A+B.

Together, A, B, C, D issue a self-signed certificate for the key A+B+C+D. Actually, only two of the four are needed. For example, A sends a special message to B that says, "Here is my private key Ka. E authorizes anyone in E's domain to combine it with other keys to sign the hash h and obtain an A+B+C+D signature." B decrypts the key in the STM, combines it with the keys Kb and Kcd of B and C+D (resp.) to form the private key for A+B+C+D. The STM then does the signature, and destroys the private keys Ka and Kabcd.

In alternate embodiments, there could be other numbers of trustees, and other minimum participation requirements. For example, the CA might use an RSA key that is the product of three prime factors. Each factor might be held by two trustees, for a total of six trustees. Three trustees can then cooperate to issue a signature, provided that they hold three different factors.

In each case, trustees release secret key information to other trustees, but only to an STM and only for certain limited purposes such as generating a particular signature or forming a particular combination key. Because the STM uses protected memory and follows specific rules for safeguarding externally provided data, the trustees cannot retain the secret key information provided by the other trustees.

Updating Users, Adding Features, Revoking Certificates

The client CCM and STM are available in several versions, and can be updated when the need arises. This can happen when bugs are found, features are added, or when customer demand causes a refinement to the trust model. The CCM is just another untrusted application and is easily updated. Updating the STM is trickier. Each client STM is identified by a name and a version number. The version number might be something like 1.51, and would increase with revisions to the program. Customers would normally prefer the higher version number, and download updates as needed. The CCM can be configured to notify the user that an update is available.

The name is used for customized versions of the client program. A particular corporation may have some special requirements for its in-house transactions, and their version of the client program would have a different name if it follows different rules or policies. Both the name and the version number get encoded into certificates, so users running one version of the STM cannot masquerade as users running another version.

Usually, users will be able to upgrade to a later version of the STM, and usually have the same access to their data that they had before. Each version of the STM is accompanied by a certificate that designates an upgrade policy. If the new version is signed by the key in that certificate, the upgrade is accepted and the new version of the STM is granted access to secrets held by the older version. Preferably, the TP will have appropriate functions for managing software upgrades.

Updates will also usually add root certificates and other certificates to the local cache, and to add CRLs. Updates may also have code to recognize new secure devices that might appear on the market.

Updates to clients and servers may be required for a variety of reasons. It is expected that the security of the system will be attacked, and that measures may need to be taken to thwart attacks and to limit the damage from attacks. For example, a skilled engineer with access to a computer motherboard might be able to release secrets that are contained in sealed storage on that motherboard, and thus undermine the attestations that are provided by the TP. It might also happen that a component does not offer the security that it promises, and so the system will have to stop recognizing attestations regarding that component. It might also happen that a rogue CCS is not following his contractual obligations, and its certificate might have to be revoked. A version of the TP may turn out to have bugs, so maybe only later versions can be trusted. In all cases, it is possible to limit the damage by updating the version of the STM, and increase the version number. In most cases, the STM can simply reject certificates that it previously accepted. For example, a smart card or TP vendor might announce that products that say "version 1.10" in their attestations are unreliable, and that only version 1.20 or higher should be trusted. Or maybe only particular hashes of a TP product might be trusted. The precise details will depend on how those products present their attestations, and how the secure products can be distinguished from the flawed products.

Compromised keys can lead to fraud, and need to be avoided. CRLs are used for that. If some vendor traces fraud to a key that must have been compromised, then that key or certificate is added to a CRL. The STM does not need to be updated. Servers can require that a recent CRL be used.

A server often wants to only allow a client to use data if it adheres to security policies. A CA certificate can have a policy in its certificate that nothing in its domain is to be trusted unless a current CRL is consulted. If so, the STM will respect it. Thus it might be impossible to export to a smart card or to buy music credits unless a CRL from the last week has been downloaded from a web site.

The invention has been described in its preferred embodiments, but many changes and modifications may become apparent to those skilled in the art without departing from the spirit of the invention. The scope of the invention should be determined by the appended claims and their legal equivalents.

I claim:

1. A computer program running on a trusted computing platform; a client public/private key pair; means to display a signed form from a server, interact securely with a user, and sign a modification of the form with said key pair; a client certificate, attesting that said processor will conform to policies implied by any document signed by said key pair; a memory value defined by said form; an external domain defined by said form, and associated to said memory value; means to agree on a session key with said server; means to decrypt and authenticate messages with said session key; a memory register, holding said memory value; means to store a cryptovariable in a secure tamper-resistant storage register; means to encrypt said memory register with said cryptovariable into a first encrypted data block; means to alter said memory register by decrypting said first encrypted data block with said cryptovariable; replacing said cryptovariable, and re-encrypting into a second encrypted data block; whereby rendering useless any copy of said first encrypted data block; and means for storing and updating said memory value in said memory register exclusively by a cryptographically secured command for said external domain.

2. The secure transaction module of claim 1, further comprising:
means to replace said session key with a second session key responsive to a cryptographically secured command, whereby said program loses the ability to decrypt any message encrypted with said session key.

3. The secure transaction module of claim 1, further comprising:
means to load, decrypt, and authenticate a document that is associated with a command to change said session key, whereby future access to the document is lost.

4. The secure transaction module of claim 1, further comprising:
means to access a server for email;
means to acquire keys from said server based on identity;
means to acknowledge a receipt for the sender;
means to respect a self-destruct tag.

5. The secure transaction module of claim 1, further comprising:
a password to further protect said memory value;
means to thwart repeated wrong guessing of said password;
means to protect said memory register from power failure, tampering, or unauthorized access;
means to upgrade to a newer version of said computer program while continuing to use secrets.

6. The secure transaction module of claim 1, further comprising:
means to access a secure device;
means to verify an attestation from said secure device;
means to transfer a secret to said secure device.

7. A method for managing remote transactions, comprising: obtaining a first certificate for a server; issuing a form from said server to a client, with at least one label defining a value designated as being under exclusive control of a domain; receiving submitted form data; verifying that said form data includes an attestation that said client processed said form under control of a properly secured transaction processor; storing a cryptovariable in a secure tamper-resistant storage register; encrypting a memory register with said cryptovariable into a first encrypted data block; altering said memory register by decrypting said first encrypted data block with said cryptovariable; replacing said cryptovariable, and re-encrypting into a second encrypted data block; whereby rendering useless any copy of said first encrypted data block;

and sending to said client a cryptographically secured command to update and store said value, and leaving said transaction processor in a state where modification commands from the client or from anywhere else outside said domain are refused.

8. The method of claim 7, further comprising:

accepting payment of money;

identifying said value with some monetary equivalent;

including in said command instructions to change the key used to load said value;

whereby said client is only able to load said command once into said processor.

9. The method of claim 7, further comprising:

issuing certificates from said server;

dividing the private key for said first certificate among a plurality of computers;

submitting partial signatures responsive to certificate requests.

10. The method of claim 7, further comprising:

requiring a subset of said computers to issue partial signatures;

combining said partial signatures and issuing a certificate.

11. The method of claim 7, further comprising:

encrypting a document with said value as a key;

sending said document to said client, with a command to change said value, whereby said client will only be able to decrypt said document once.

12. The method of claim 7, further comprising:

acting as a secure server for email;

providing public keys corresponding to email addresses on demand;

offering an option for sender receipts.

13. The method of claim 7, further comprising:

permitting said value to be transferred to a smart token with a suitable attestation;

requiring said client to check a current certificate revocation list.

* * * * *